United States Patent
Kalyanasundharam et al.

(10) Patent No.: US 11,036,658 B2
(45) Date of Patent: Jun. 15, 2021

(54) LIGHT-WEIGHT MEMORY EXPANSION IN A COHERENT MEMORY SYSTEM

(71) Applicants: Advanced Micro Devices, Inc., Santa Clara, CA (US); ATI Technologies ULC, Markham (CA)

(72) Inventors: Vydhyanathan Kalyanasundharam, Sunnyvale, CA (US); Philip Ng, Toronto (CA); Alexander J Branover, Chestnut Hill, MA (US); Kevin M. Lepak, Austin, TX (US)

(73) Assignees: Advanced Micro Devices, Inc., Santa Clara, CA (US); ATI Technologies ULC, Markham (CA)

(*) Notice: Subject to any disclaimer, the term of this patent is extended or adjusted under 35 U.S.C. 154(b) by 55 days.

(21) Appl. No.: 16/249,649

(22) Filed: Jan. 16, 2019

(65) Prior Publication Data

US 2020/0226081 A1    Jul. 16, 2020

(51) Int. Cl.
*G06F 13/16* (2006.01)
*G06F 9/38* (2018.01)
*G06F 9/50* (2006.01)
*G06F 9/48* (2006.01)

(52) U.S. Cl.
CPC ........ *G06F 13/1694* (2013.01); *G06F 9/3877* (2013.01); *G06F 9/4881* (2013.01); *G06F 9/5005* (2013.01)

(58) Field of Classification Search
CPC .. G06F 13/1694; G06F 9/4881; G06F 9/5005; G06F 9/3877
See application file for complete search history.

(56) References Cited

U.S. PATENT DOCUMENTS

| | | | |
|---|---|---|---|
| 7,062,610 B2 | 6/2006 | Conway | |
| 7,155,572 B2 | 12/2006 | Hughes et al. | |
| 9,792,210 B2 | 10/2017 | Conway | |
| 10,042,762 B2 | 8/2018 | Jayasena et al. | |
| 2013/0297845 A1* | 11/2013 | Ziakas | G06F 13/385 710/306 |
| 2019/0095363 A1* | 3/2019 | Agarwal | G06F 13/4282 |

* cited by examiner

*Primary Examiner* — David Yi
*Assistant Examiner* — Alan Otto
(74) *Attorney, Agent, or Firm* — Polansky & Associates, P.L.L.C.; Paul J. Polansky; Nathan H. Calvert

(57) ABSTRACT

Systems, methods, and port controller designs employ a light-weight memory protocol. A light-weight memory protocol controller is selectively coupled to a Cache Coherent Interconnect for Accelerators (CCIX) port. Over an on-chip interconnect fabric, the light-weight protocol controller receives memory access requests from a processor and, in response, transmits associated memory access requests to an external memory through the CCIX port using only a proper subset of CCIX protocol memory transactions types including non-cacheable transactions and non-snooping transactions. The light-weight memory protocol controller is selectively uncoupled from the CCIX port and a remote coherent slave controller is coupled in its place. The remote coherent slave controller receives memory access requests and, in response, transmits associated memory access requests to a memory module through the CCIX port using cacheable CCIX protocol memory transaction types.

20 Claims, 6 Drawing Sheets

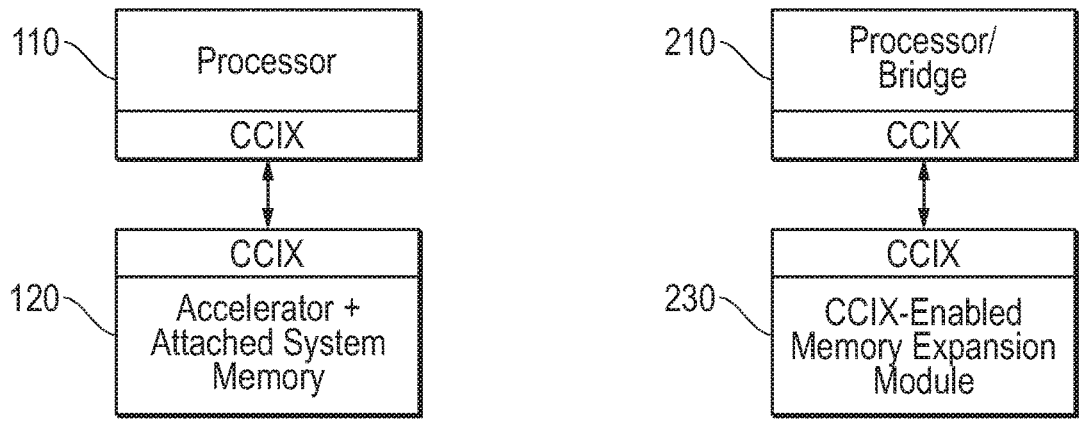
*FIG. 1*
*FIG. 2*
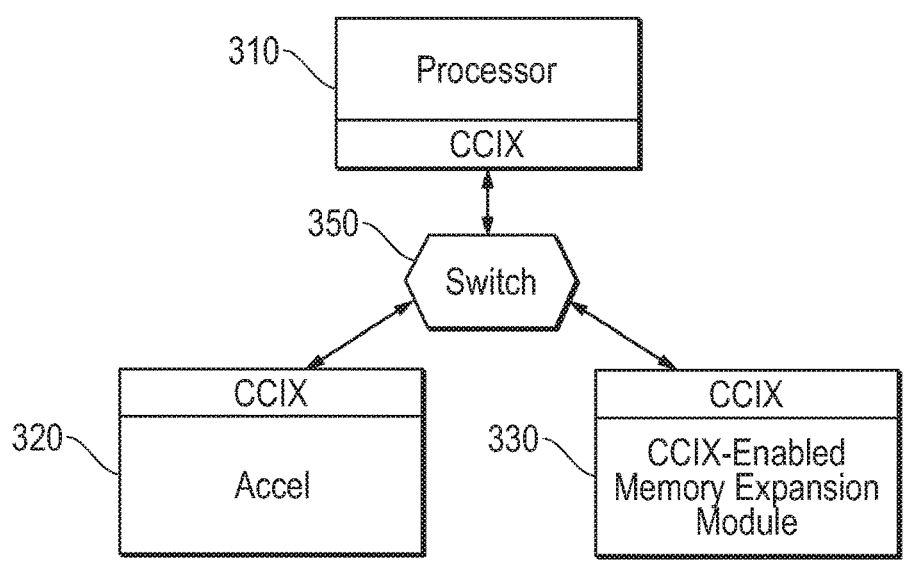
*FIG. 3*

| CCIX MEMORY REQUEST TYPES FULL SET | | |
|---|---|---|
| Request Type | ReqOp[7:0] | Request Type |
| Reads | 0x00 | ReadNoSnp |
| | 0x01 | ReadOnce |
| | 0x02 | ReadOnceCleanInvalid |
| | 0x03 | ReadOnceMakeInvalid |
| | 0x04 | ReadUnique |
| | 0x05 | ReadClean |
| | 0x06 | ReadNotSharedDirty |
| | 0x07 | ReadShared |
| Dataless | 0x10 | CleanUnique |
| | 0x11 | MakeUnique |
| | 0x13 | Evict |
| | 0x14 | CleanShared |
| | 0x15 | CleanSharedPersist |
| | 0x16 | CleanInvalid |
| | 0x17 | MakeInvalid |
| | 0x94 | CleanSharedSnpMe |
| | 0x95 | CleanSharedPersistSnpMe |
| | 0x96 | CleanInvalidSnpMe |
| | 0x97 | MakeInvalidSnpMe |
| Writes | 0x20 | WriteNoSnpPtl |
| | 0x21 | WriteNoSnpFull |
| | 0x23 | WriteUniquePtl |
| | 0x24 | WriteBackPtl |
| | 0x25 | WriteBackFullUD |
| | 0x27 | WriteBackFullSD |
| | 0x2B | WriteCleanFullSD |
| | 0x2D | WriteEvictFull |
| Atomics | 0x4x | AtomicStore |
| | 0x5x | AtomicLoad |
| | 0x60 | AtomicSwap |
| | 0x61 | AtomicCompare |
| | 0xCx | AtomicStoreSnpMe |
| | 0xDx | AtomicLoadSnpMe |
| | 0xE0 | AtomicSwapSnpMe |
| | 0xE1 | AtomicCompareSnpMe |
| Chained | 0xF0 | ReqChain |

*FIG. 6*

| CCIX MEMORY REQUEST TYPES - NON-CACHEABLE AND NON SNOOPING ||||||||
|---|---|---|---|---|---|---|
| | Transaction Type | Req Type | Direction | ReqOp | Comments | Data Size |
| 1 | ReadNoSnp | Reads | Outbound from the processor | 0x00 | Read request to a non-snoopable address | D32B or 64B only (reads smaller than 64B are rounded up to 64B) |
| 2 | WriteNoSnpFull | Writes | Outbound from the processor | 0x21 | Write full cache line to a non-snoopable address | 64B. All Byte Enables are asserted |
| 3 | WriteNoSnpFull | Writes | Outbound from the processor | 0x20 | Write with byte enables to a non-snoopable address | 64B data with byte enables |
| | | | Outbound from the processor | | In configurations with byte enables disabled-an Host writes of less than 64B are achieved using a Read-Modified-Write sequence | 64B with byte enabled disabled |

*FIG. 7*

LIGHT-WEIGHT MEMORY EXPANSION IN A COHERENT MEMORY SYSTEM

BACKGROUND

System interconnect bus standards provide for communication between different elements on a chip, different elements with a multi-chip module, a circuit board, or a server node. For example, the popular Peripheral Component Interconnect Express (PCIe) computer expansion bus developed by the Peripheral Components Special Interest Group is a high-speed serial expansion bus providing interconnection between elements on a motherboard, and connecting to expansion modules that plug into card slots or mount to a motherboard. While PCIe works well as an input/output (I/O) protocol, it does not provide enough support for processing elements to communicate within a multi-core, heterogenous processing model.

Other interconnect standards are being developed to provide for improved system architectures having multiple processor cores together with expansion memory and accelerators such as Graphic Processing Units (GPUs) and Field-Programmable Gate Arrays (FPGAs). Such multiple processor systems often access a common memory with a common memory address space. The common memory may be in system memory or external memory modules.

BRIEF DESCRIPTION OF THE DRAWINGS

FIG. 1 illustrates in block diagram form a data processing platform connected in an exemplary topology enabled by CCIX.

FIG. 2 illustrates in block diagram form a data processing platform connected in another exemplary topology enabled by CCIX.

FIG. 3 illustrates in block diagram form a data processing platform connected in a more complex exemplary topology enabled by CCIX.

FIG. 6 shows in table form a set of CCIX memory access request types employed by a remote coherent slave controller.

FIG. 7 shows in table form a set of CCIX memory access request types employed by a light-weight memory protocol controller according to some embodiments.

Figure 4:
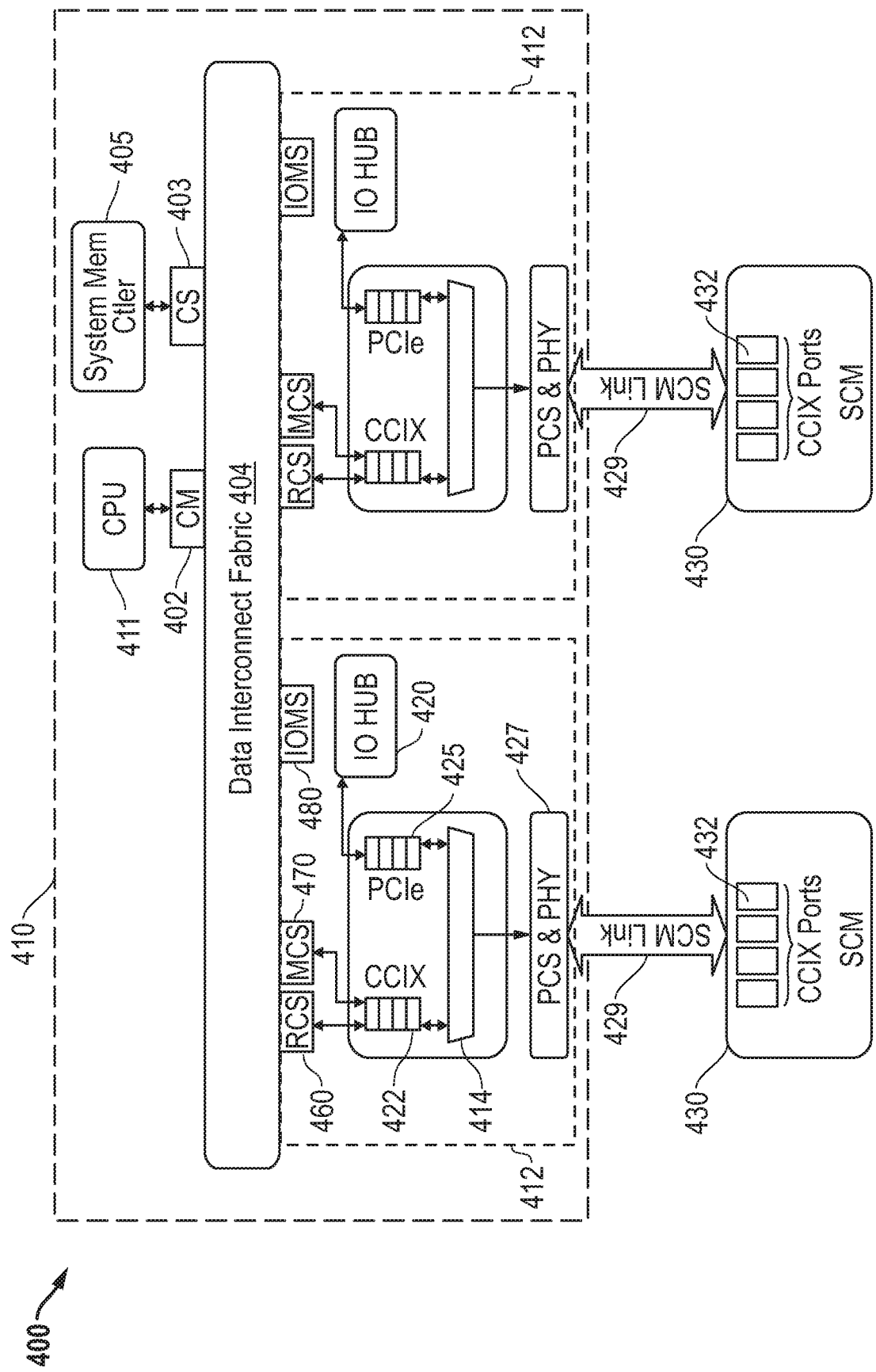
FIG. 4 illustrates in block diagram form a design of an exemplary data processing platform according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A port controller on an integrated circuit includes a physical layer circuit coupled to an external Peripheral Component Interconnect Express (PCIe) communication link, a Cache Coherent Interconnect for Accelerators (CCIX) port selectively coupled to the physical layer circuit, and a transaction layer controller selectively coupled to the physical layer circuit and operating according to an alternate protocol. The port controller includes a light-weight memory protocol controller to send requests to and receive responses from a memory through the CCIX port and over the PCIe communication link using a subset of CCIX protocol memory transaction types including only non-cacheable transactions and non-snooping transactions. The port controller also includes a remote coherent slave controller to send cache coherency requests over the PCIe communication link using a full set of CCIX protocol memory transaction types. A multiplexer/demultiplexer selectively couples one of the light-weight memory protocol controller and the remote coherent slave controller to the CCIX port.

A method includes selectively coupling a light-weight memory protocol controller to a Cache Coherent Interconnect for Accelerators (CCIX) port. Subsequently, over an on-chip interconnect fabric, memory access requests are received from a processor and, in response, associated memory access requests are transmitted to an external memory through the CCIX port using only a proper subset of CCIX protocol memory transaction types including non-cacheable transactions and non-snooping transactions. The method includes selectively decoupling the light-weight memory protocol controller from the CCIX port and coupling a remote coherent slave controller to the CCIX port. Subsequently, at the remote coherent slave controller, memory access requests are received over the on-chip interconnect fabric and, in response, associated memory access requests are transmitted to a memory module through the CCIX port using cacheable CCIX protocol memory transaction types.

A data processing system includes at least one processor and an interconnect fabric connected to the at least one processor. A port controller is connected to the interconnect fabric and includes a physical layer circuit coupled to an external Peripheral Component Interconnect Express (PCIe) communication link, a Cache Coherent Interconnect for Accelerators (CCIX) port selectively coupled to the physical layer circuit, and a transaction layer controller selectively coupled to the physical layer circuit and operating according to an alternate protocol. The port controller includes a light-weight memory protocol controller coupled to the interconnect fabric and for sending requests to and receiving responses from a memory through the CCIX port and over the PCIe communication link using a subset of CCIX protocol memory transaction types including only non-cacheable transactions and non-snooping transactions. The port controller also includes a remote coherent slave controller to send cache coherency requests over the PCIe communication link using a full set of CCIX protocol memory transaction types. A multiplexer/demultiplexer selectively couples one of the light-weight memory protocol controller and the remote coherent slave controller to the CCIX port.

FIG. 1 illustrates in block diagram form a data processing platform 100 connected in a simple exemplary topology provided in Cache Coherent Interconnect for Accelerators (CCIX) protocols. A host processor 110 ("host processor," "host") is connected using the CCIX protocol to an accelerator module 120, which includes a CCIX accelerator and an attached memory on the same device. The CCIX protocol is found in CCIX Base Specification 1.0 published by CCIX Consortium, Inc. The standard provides a CCIX link which enables hardware-based cache coherence, which is extended to accelerators and storage adapters. In addition to cache memory, CCIX enables expansion of the system memory to include CCIX device expansion memory. The CCIX architecture thereby allows multiple processors to access system memory as a single pool. Such pools may become quite large as processing capacity increases, requiring the memory pool to hold application data for processing threads on many interconnected processors. Storage memory also becomes large for the same reasons.

Data processing platform 100 includes host random access memory (RAM) (not shown) connected to host processor 110, typically through an integrated memory controller. The memory of accelerator module 120 can be host-mapped as part of system memory in addition to the RAM, or exist as a separate shared memory pool. The CCIX protocol is employed with data processing platform 100 to provide expanded memory capabilities, including functionality provided herein, in addition to the acceleration and cache coherency capabilities of CCIX.

FIG. 2 illustrates in block diagram form a data processing platform 200 with another simple topology for CCIX applications. Data processing platform 200 includes a host processor 210. Host processor 210 communicates over a bus through a CCIX interface to a CCIX-enabled memory expansion module 230 that includes memory. Like the configuration of FIG. 1, the memory of expansion module 230 can be host-mapped as part of system memory. The expanded memory capability may offer expanded memory capacity or allow integration of new memory technology beyond that which host processor 210 is capable of directly accessing, both with regard to memory technology and memory size.

FIG. 3 illustrates in block diagram form a data processing platform 300 with a switched topology for CCIX applications. Host processor 310 connects to a CCIX-enabled switch 350, which also connects to accelerator module 320 and CCIX-enabled memory expansion module 330. Accelerator module 320 may be a GPU or other specialized processor. The expanded memory capabilities and capacity of the prior directly-connected topologies are provided in data processing platform 300 by connecting the expanded memory through switch 350. While several exemplary topologies are shown for a data processing platform, the techniques herein may be employed with other suitable topologies including mesh topologies.

FIG. 4 illustrates in block diagram form an exemplary data processing platform 400 according to some embodiments. Generally, host processor 410 connects through port controllers 412 to two memory expansion modules 430. This connection is made over a CCIX/PCIe enabled bus 429, which in this version operates as a storage class memory (SCM) link. Two separate CCIX/PCIe busses 429 are shown, which may be implemented with two separate data busses, or different groups of serial lanes on the same bus. While a point-to-point connection is shown, a switched connection is also possible like that of FIG. 3. The techniques herein may also be employed with other topologies employing CCIX data processing platforms, such as grid peer-to-peer connections. Other data transmission protocols with packet-based communication links may also use the techniques herein.

Data interconnect fabric 404 is an on-chip data interconnect fabric which connects CPU 411, through Cache coherent master 402, to a coherent slave (CS) 403, which connects to system memory controller 405. Elements connected to data fabric 404 are addressable within the fabric to connect to other elements on the fabric. System memory controller 405 connects to locally attached RAM, typically though a dedicated memory bus. CS 403 is a coherent slave controller performing the protocol functions of a home agent. It is noted that other processing elements, including processors not present on the chip of processor 410, may access system memory controller 405 by connecting to data interconnect fabric 404.

Each port controller 412 is connected to data interconnect fabric 404 for allowing CPU 411, and potentially other processing elements, to access memory expansion modules 430. While two port controllers 412 are shown, one or more may be used in different embodiments. In this embodiment, port controllers 412 are identical and each includes at least two coherent slave controllers 460 and 470 connected to data interconnect fabric 404, both operating according to the CCIX protocol and performing protocol functions of handling memory access requests required by home agent. While a single CPU 411 is shown to simplify the illustration, multiple CPU cores or other processors may be connected to data interconnect fabric 404, with data interconnect fabric 404 operable to communicatively link any of the processors to either port controller using addresses on data interconnect fabric 404.

Coherent slave controller 460 is a remote coherent slave (RCS) controller instantiating a CCIX slave agent which provides memory coherency within its address domain, and sends cache coherency requests over the PCIe communication link using a full set of CCIX protocol memory transaction types, as will be further described below. Any CCIX protocol component that sends or receives CCIX requests is referred to as a CCIX agent. The agent may be a Request Agent, a Home Agent, or a Slave Agent. A Request Agent is a CCIX Agent that is the source of read and write transactions. A Home Agent is a CCIX Agent that manages coherency and access to memory for a given address range. As defined in the CCIX protocol, a Home Agent manages coherency by sending snoop transactions to the required Request Agents when a cache state change is required for a cache line. Each CCIX Home Agent acts as a Point of Coherency (PoC) and Point of Serialization (PoS) for a given address range. CCIX enables expanding system memory to include memory attached to an external CCIX Device. When the relevant Home Agent resides on one chip and some or all of the physical memory associated with the Home Agent resides on a separate chip, generally an expansion memory module of some type, the controller of the expansion memory is referred to as a Slave Agent. The CCIX protocol also defines an Error Agent, which typically runs on a processor with another agent to handle errors.

Coherent slave controller 470 is a memory coherent slave (MCS) light-weight memory protocol controller and adapted to send requests to and receive responses from a memory through the CCIX port using a subset of CCIX protocol memory transaction types including only non-cacheable transactions and non-snooping transactions, as will be further described below.

CCIX port 422 is selectively connected to coherent slave controllers 460 and 470 such that CCIX port 422 can selectively communicate with either one of the coherent slave controllers. A multiplexer/demultiplexer 414 is connected to the downstream end of CCIX port 422, and operates to selectively connect either CCIX port 422 or a PCIe transaction layer controller 425 to a common physical layer circuit 427. Physical layer circuit 427 in this version includes a PCIe physical coding layer (PCS) circuit and a PHY (physical layer) circuit adapted to also operate as a PCS and PHY for CCIX protocols.

An input/output master slave controller (IOMS) 480 is also connected to data interconnect fabric 404, for providing a path for other types of data traffic, formatted in a different protocol than CCIX, for example a PCIe protocol. IOMS 480 is connected to I/O hub 420, which selectably connects traffic to a variety of selectable ports such as serial ports (not shown) and PCIe transaction layer controller 425. IOMS 480 is addressable on data interconnect fabric 404 and provides a path for CPU 411 interconnect with alternate protocols through port controller 412.

Data processing platform 400 is shown with two memory expansion modules 430, however one or more may be used. Each memory expansion module 430 may be an expansion card type module with a PCIe connector, or may be mounted to the motherboard carrying host processor 410 or in a multi-chip module with host processor 410. Memory expansion module 430 includes a memory with one or more memory chips and an interface controller, typically a separate chip. The interface controller includes a memory controller and an I/O port 432 connected to PCIe link 429. Multiple channels or a single channel may be used in the connection.

Memory expansion modules 430 may be used in a memory-centric architecture or a traditional, processor-centric architecture as supported by CCIX. In this embodiment, memory expansion modules 430 are a class memory (SCM). However, this example is not limiting, and many types of memory expansion modules may employ the techniques described herein. For example, a memory expansion module 430 may include a RAM memory, or a memory with mixed non-volatile memory (NVM) and RAM may be used, such as a high-capacity flash storage or any other suitable memory technologies. One or more of memory expansion modules 430 may operate as a CCIX slave agent and implement its associated CCIX protocol layer. Alternately, when employed in coordination with a light-weight memory protocol controller such as that provided by coherent slave controller 470, the memory expansion modules may not operate as a CCIX slave agents, but instead include a standard memory controller adapted for the particular type of memory employed. This arrangement allows host processor 410 and coherent slave controller 470 to employ a non-CCIX enabled memory transparently together with other CCIX agents to provide a heterogenous memory fabric.

Figure 5:
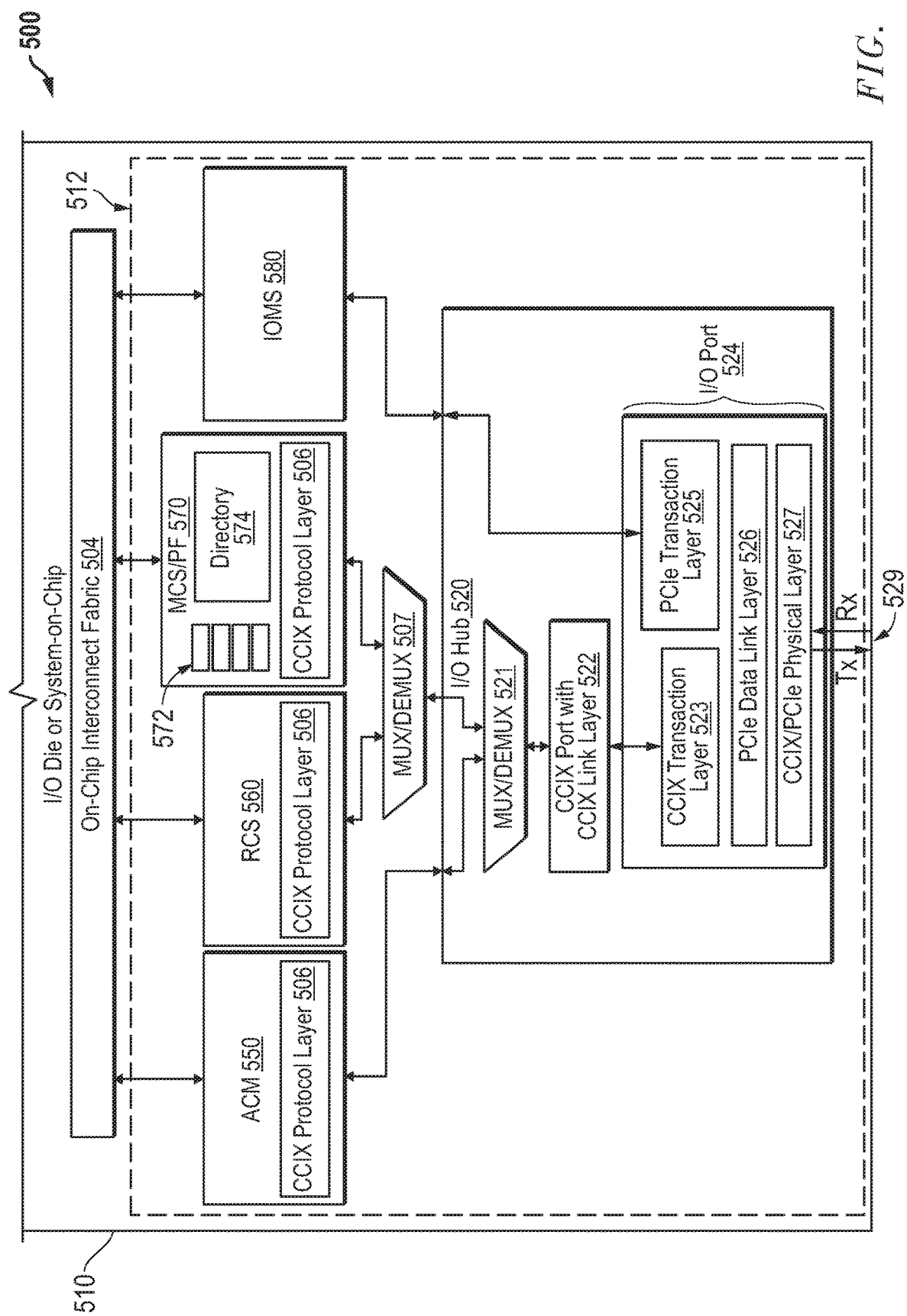
FIG. 5 shows in block diagram form a portion of a data processing platform including a port controller according to some embodiments.

FIG. 5 shows in block diagram form a portion of data processing platform 500 including a port controller 512 according to some embodiments. The depicted port controller 512 may be employed with any suitable system topology including those shown in FIGS. 1-4. Data interconnect fabric 504 is an on-chip interconnect fabric connecting port controller 512 to the remainder of data processing platform 500, not shown. Port controller 512 generally provides four different paths through which processors may access a communication link through an I/O port 524, which in this version is a CCIX/PCIe port enhanced to provide communications formatted in different protocols. Port controller 512 includes an I/O hub 520 providing configurable access to I/O port 524, a series of four different CCIX slave or master/slave controllers 550, 560, 570, and 580 for handling various communication tasks, and interconnect circuitry for bi-directionally connecting traffic with I/O port 524 and to an external CCIX/PCIe bus 529. Some embodiments may not include all four of the slave or slave/master controllers.

Port controller 512 includes several agents that can initiate and respond to coherent data traffic in response to memory requests received from interconnect fabric 404 and from a remote PCIe master. These agents include a CCIX accelerator coherent master controller (ACM) 550, a CCIX remote coherent slave controller (RCS) 560, and a light-weight memory protocol controller 570. Each of these agents includes a CCIX protocol layer controller 506 connecting the agent to a CCIX port 522 through suitable interconnect circuitry such as the depicted multiplexer/demultiplexers 507 and 521.

ACM 550 is connected to data interconnect fabric 504 and to I/O hub 520 and receives and fulfills cache coherency requests from an external processing accelerator over the communication link. ACM 550 instantiates a full CCIX master agent having the capability to use a full set of CCIX protocol memory transaction types (see FIG. 6) for making and fulfilling memory access requests to memory attached to host or other accelerators. Multiplexer/demultiplexer 521 selectively connects ACM 550 to CCIX port 522, enabling communication with devices connected to CCIX/PCIe bus 529.

CCIX remote coherent slave controller (RCS) 560 and a light-weight memory protocol controller 570 are both selectively connected into I/O hub 520 through multiplexer/demultiplexer 507. RCS 560 is a CCIX agent to send cache coherency requests over the PCIe communication link using a full set of CCIX protocol memory transaction types, namely those listed in FIG. 6 below.

Light-weight memory protocol controller 570 is a coherent slave controller to send requests to and receive responses from a memory module through the CCIX port using a subset of CCIX protocol memory transaction types including only non-cacheable transactions and non-snooping transactions. In this embodiment, light-weight memory protocol controller 570 is a CCIX memory coherent slave/probe filter (MCS/PF) which maintains a memory directory (574) for the memory module, and a memory access request queue 572. The MCS/PF operates as a CCIX slave controller to manage access to an external memory module that does not perform CCIX coherent agent functionality. The probe filter operates to filter out cache coherence probes directed to the memory address space of the memory module managed by light-weight memory protocol controller 570. Memory directory 574 is employed to provide directory-based coherence for the external memory module, fulfilling directory-based coherence requests locally at the agent, and transforming access requests that may include coherency-related requests to a form using only the light-weight set of requests as listed in FIG. 7. Request queue 572 is maintained to manage the flow of access requests received by light-weight memory protocol controller 570 for access to its associated memory module.

An input/output master slave controller (IOMS) 580 is also connected to data interconnect fabric 504 for providing a path for other types of data traffic. IOMS 580 is connected to I/O hub 520, which selectably connects traffic to a variety of selectable ports such as serial ports (not shown) and to PCIe transaction layer controller 525. IOMS 580 is addressable on data interconnect fabric 504 and provides a path for CPU 411 interconnect with the PCIe protocol through port controller 512.

I/O hub 520 generally includes an I/O port 524 which operates in a PCIe mode or a CCIX mode. CCIX traffic goes through CCIX port 522, which includes a CCIX link layer controller and forms a virtual CCIX port serving as a connection point for CCIX slave or master/slave controllers 550, 560, and 570 to communicate with devices on PCIe bus 529 such as memory expansion modules 230 and 330, and accelerators 120 and 320. CCIX communications are overlaid on a PCIe data link layer and physical layer signaling through CCIX/PCIe bus 529. PCIe traffic from IOMS 580 goes through a PCIe input connecting directly to PCIe transaction layer controller 525.

CCIX port 522 is connected in the upstream direction to the downstream input/output terminal of multiplexer/demultiplexer 521. As shown, multiplexer/demultiplexer 521 selectively connects ACM 550 or the downstream input/output terminal of multiplexer/demultiplexer 507 to CCIX port 522. Multiplexer/demultiplexer 507 has two upstream input/output terminals connected to the CCIX protocol layers of remote coherent slave 560 and light-weight memory protocol controller 570, and is operable to selectively connect them to multiplexer/demultiplexer 521. While two multiplexer/demultiplexers are used in this embodiment, other selectable interconnect circuitry may be used. For example, a three-to-one multiplexer/demultiplexer may be used. CCIX port 522 connects in the downstream direction to CCIX transaction layer controller 523, which operates to complete each information transaction of the CCIX traffic while reducing latency that might be introduced were the same traffic carried by the PCIe transaction layer controller 525. CCIX port 522 creates a sufficient number of virtual transaction channels for deadlock free communication of CCIX protocol messages. These virtual transaction channels also allow time division multiplexing between ACM 550, RCS 560, and light-weight memory protocol controller 570, providing for multiple virtual CCIX links to be active over the same PCIe lanes.

FIG. 6 shows in table form a set of CCIX memory access requests types fulfilled by a remote coherent slave controller such as RCS 560. The requests come from one or more CCIX request agents in the data processing platform, and are set forth in the CCIX standard. The table includes the full set of requests specified in the standard. Generally, the requests include five types of transactions: read transactions, dataless transactions, write transaction, atomic transactions, and chained transactions.

The read memory access transactions include:
ReadNoSnp: Read request to a Non-snoopable address region. The received data is not cached coherently at the Requester.
ReadOnce: Read request to a Snoopable address region. Obtains a snapshot of the coherent data. The received data is not cached in a coherent state at the Requester.
ReadOnceCleanInvalid: Read request to a Snoopable address region. Obtains a snapshot of the coherent data.
ReadOnceMakeInvalid: Read request to a Snoopable address region. Obtains a snapshot of the coherent data.
ReadUnique: Read request to a Snoopable address region to perform a store to the cache line.
ReadClean: Read request to a Snoopable address region.
ReadNotSharedDirty: Read request to a Snoopable address region. Data is provided to the Requester in any cache state except SD.
ReadShared: Read request to a Snoopable address region.
The dataless memory access transactions include:
CleanUnique: Request to a Snoopable address region. Changes the state to Unique to carry out a store to the cache line.
MakeUnique: Request to Snoopable address region. Obtains ownership of the cache line without a Data response.
Evict: Indicates that a Clean cache line is no longer cached by a caching agent.
CleanShared: Changes cached copies to a Non-dirty state and any Dirty copy is written back to memory.
CleanSharedPersist: Changes cached copies to a Non-dirty state and any Dirty cached copy is written back to the Point of Persistence (PoP).
CleanInvalid: Invalidates cached copies, and writes any Dirty copy to memory.
MakeInvalid: Invalidates cached copies and disgarts any Dirty copy.
SnpMe Variants: Each of the CleanShared, CleanSharedPersist, CleanInvalid and MakeInvalid transactions has a SnpMe variant, with a [SnpMe] suffix. SnpMe indicates, from Requester to a Home, that the Requester has not checked its caches for a copy of the line and the Requester instructs the Home to Snoop the Requester if required.
The write memory access transactions include:
WriteNoSnpPtl: Writes to Non-snoopable address region with data size up to a cache line in length.
WriteNoSnpFull: Writes a full cache line of data to a Non-snoopable address region.
WriteUniquePtl: Writes to a Snoopable address region. Writes up to a cache line of data to the next-level cache or memory when the cache line is invalid at the Requester.
WriteUniqueFull: Writes to a Snoopable address region. Writes a full cache line of data to the next-level cache or memory when the cache line is invalid at the Requester.
CopyBack Transactions: CopyBack transactions are a subclass of Write transactions. Copies back coherent data from a cache to the next level cache or memory.
WriteBackPtl: Writes back up to a cache line of Dirty data to the next level cache or memory.
WriteBackFull: Writes back a full cache line of Dirty data to the next level cache or memory. Byte enables not present, assumes all byte enables are asserted. The cache line does not remain in the cache. There are two flavors of WriteBackFull:
  i. WriteBackFullUD: The cache state when WriteBack was initiated was UD.
  ii. WriteBackFullSD: The cache state when WriteBack was initiated was SD.
WriteCleanFull: Writes back a full cache line of Dirty data to the next level cache or memory and retain a Clean copy in the cache.
WriteCleanFullSD: The cache line is guaranteed to be in Shared state after the transaction completes.
WriteEvictFull: Writes back Unique Clean data to the next-level cache.

Next, the table shows atomic type access requests. An Atomic transaction permits a Requester to send a transaction with a memory address and an operation to be performed on that memory location. The atomic type requests include:
AtomicStore: Sends a single data value with an address and the atomic operation to be performed.
AtomicLoad: Sends a single data value with an address and the atomic operation to be performed.
Atomic Swap: Sends a single data value, the swap value, together with the address of the location to be operated on.
AtomicCompare: Sends two data values, the compare value and the swap value, with the address of the location to be operated on. If the values match, the target writes the swap value to the addressed location.

If the values do not match, the target does not write the swap value to the addressed location.

SnpMe Variants: Each of the above described Atomic transactions has a SnpMe variant, with [SnpMe] added as a suffix to the request. A Requester can use the SnpMe variant for a line if the line is in its cache, and it is unable perform the operation internally and is unable to write back the Dirty copy to home. The SnpMe variant has the same properties as the corresponding non-SnpMe variant.

Finally, the table shows a chained request type, ReqChain. Chained requests allow for a shortened or compressed header format, reducing data transmitted for a group of related requests. An optimized message is sent for a request which is to the subsequent address of a previous Request message. A special ReqOp opcode, ReqChain, indicates a chained Request. The actual opcode of the chained Request is interpreted to be identical to the original Request. A chained Request does not include the ReqAttr, NS, or QoS fields. Instead, these fields are all implied to be identical to the original Request. The Addr value is obtained by adding 64 for 64B cache line or 128 for 128B cache line to the Addr of previous Request in the chain.

The use of the full set memory access requests as shown in FIG. 6, presents a challenge for instantiating CCIX agents in memory modules such as SCM modules. Supporting so many commands requires a much larger, more expensive processor than supporting only non-caching commands. Such processors also tend to have a higher latency in responding to commands. Furthermore, the full command set is unsuitable for use with inexpensive expansion memory which may be used for storage expansion or large memory pools.

FIG. 7 shows in table form a subset of CCIX memory access requests types employed by a light-weight memory protocol controller (e.g., 470 or 570) according to some embodiments. The depicted subset of transactions is a proper subset of the full set of requests in FIG. 6. That is, it includes some but not all of the request types. Generally, the subset includes the non-cacheable requests and non-snooping requests from the full set of memory access request types shown in FIG. 6. These requests, described above, include ReadNoSnp, WriteNoSnpFull, and WriteNoSnpPtl. The light-weight memory protocol controller supports the "write no snoop partial" request, WriteNoSnpPtl, in two different configurations. For memory modules in which byte-enabled write requests are supported, the WriteNoSnpPtl request is directly supported. For memory modules in which byte-enabled write requests are not supported or are disabled, the light-weight memory protocol controller supports WriteNoSnpPtl requests by translating them into two commands including reading a full cache line including the desired partial location with a ReadNoSnp, modifying the desired partial data, and then writing the modified full cache line to the desired location with a WriteNoSnpFull command. Such a sequence is transparent to the requesting agent, with the acknowledgement transmitted as an acknowledgement to the original WriteNoSnpPtl request.

Figure 8:
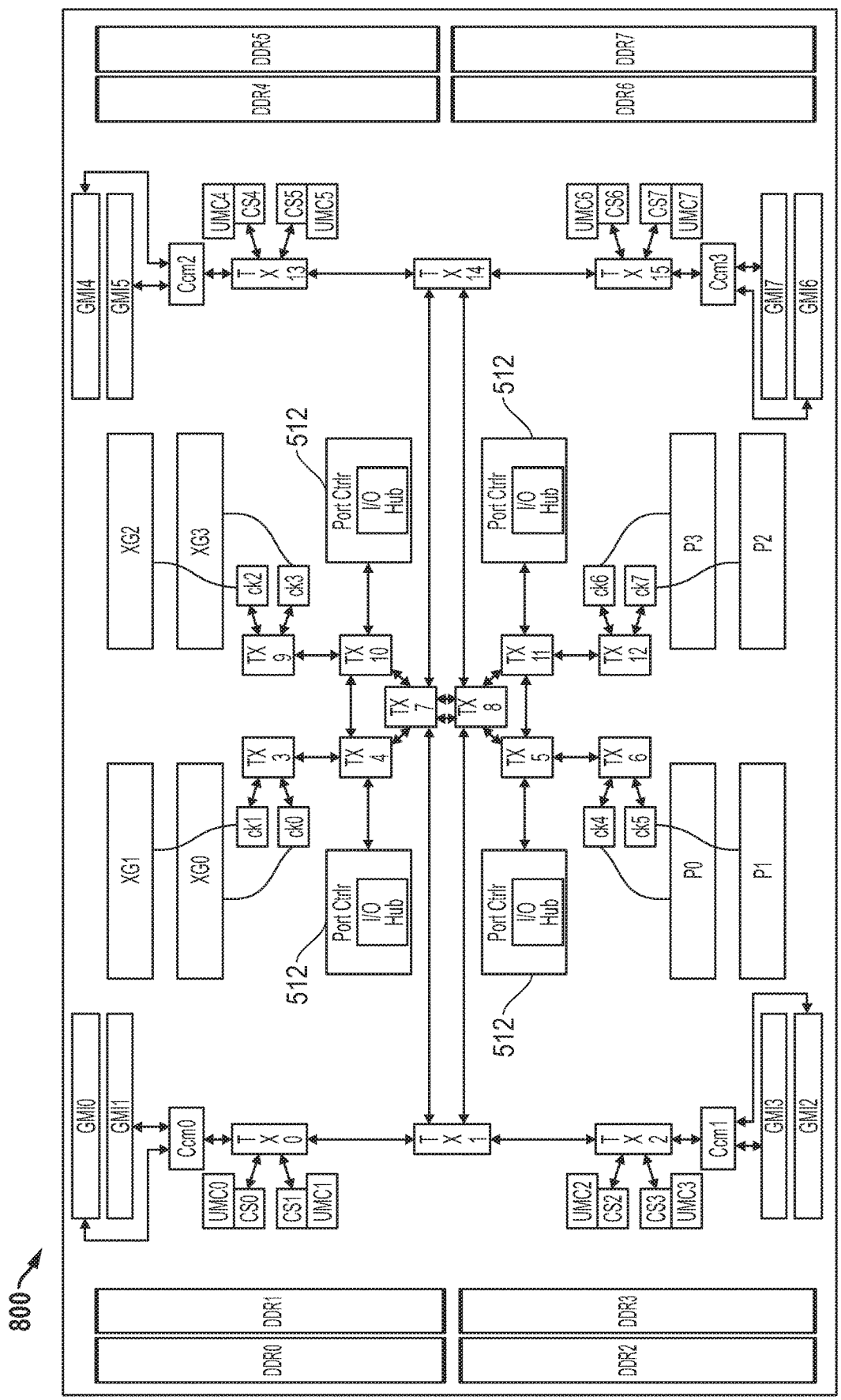
FIG. 8 shows in block diagram form a memory access sub-system for a multi-processor data processing platform according to some embodiments.

FIG. 8 shows in block diagram form a memory access sub-system 800 for a multi-processor data processing platform according to some embodiments. Memory access sub-system 800 shows an example of a large heterogenous data processing platform which would benefit using the light-weight CCIX protocol.

Memory access sub-system 800 includes a data interconnect fabric 804 to which multiple processors are connected through transport switches labeled TX0-TX15. The data interconnect fabric connections are depicted with arrows and include high speed on-chip data bus connections. The various endpoints are addressable on the data interconnect fabric 804. Generally, data interconnect fabric 804 provides system data communications and memory access communications, hosting a complex CCIX memory fabric that includes DDR system memory and external CCIX-enabled memory modules.

Four of the transport switches TX4, TX5, TX10, and TX11 are connected to four respective instances of a port controller 512, constructed as shown in FIG. 5. The port controllers 512 each have access to respective I/O ports P0, P1, P2, and P3. This design allows different types of CCIX-enabled memory modules to be added on to memory access sub-system 800.

A number of unified memory controllers UMC0-UMC7 are each connected to a respective one of DDR DRAM memories labeled DDR0-DDR7 to provide the system memory. Each memory controller is also connected to a CCIX coherent slave controller, respectively labeled CS0-CS7, which are connected as shown to transport switches TX0, TX2, TX13, and TX15. CCIX coherent slave controllers CS0-CS7 each instantiate a CCIX slave agent, and allow access to the DDR memory through the CCIX memory fabric.

Transport switches TX3 and TX9 each connect to a respective pair of socket extenders, which in this embodiment are coherent AMD® socket extenders (CAKEs), labeled CK0-CK3. The CAKEs encode local data fabric requests onto serialized packets each cycle and transmits them over a SerDes (Serializer/Deserializer) interface. Responses are also decoded by the CAKE back to the data fabric. The CAKEs connect respectively to four XGMI (inter-chip global memory interconnect) ports XG0-XG3. Ports XG0-XG3 provide peer-to-peer processor interconnection to other chips in the data processing platform. Transport switches TX6 and TX12 are similarly each connected to a respective pair of socket extenders, which in this embodiment are CAKEs CK4, CK5, CK6, and CK7. These CAKEs encode local data fabric requests as required onto ports P0-P3.

External processors, typically GPUs, are also able to access system memory and the memory fabric through eight GMI (Global Memory Interconnect) links labeled GMI0-GMI7. The GMI links provide a high-speed interconnect link operating at 100 GB/s or more, improving both the speed and latency performance over PCIe-based links. The GMI links connect to data interconnect fabric 804 through respective CCIX enabled Cache-Coherent Masters (CCMs), labeled CCM0-CCM3, which provide the mechanism for coherent data transports between processor cores.

Data interconnect fabric 804 also includes additional transport switches TX7 and TX8, which connect the centrally depicted transport switches TX3, TX4, TX5, TX8, TX9, TX10, and TX 11 to transport switches TX1 and TX14, allowing access to system memory elements and external processor elements connected to transport switches TX0, TX2, TX13, and TX15.

In operation, data interconnect fabric 804 hosts a CCIX memory fabric on which the system processors and external processors may access system memory, external processor memory, and memory expansion modules. In particular, the CCIX memory fabric enables access to both fully CCIX compliant memory expansion modules and light-weight memory expansion modules (those not supporting cache coherency) through port controllers 512. The light-weight memory expansion protocol provided through light-weight memory protocol controllers 570 of port controllers 512 provides a seamless access to light-weight memory expansion modules while complying with CCIX protocols. The multiple port controllers 512 allow a variety of system configurations by enabling native PCIe devices, CCIX-enabled devices, and non-CCIX enabled memory modules to be connected to CCIX/PCIe bus 529.

In a memory-centric configuration, any of port controllers 512 may have their light-weight memory protocol controller 570 linked to an external light-weight memory expansion module using the CCIX protocol though I/O port 514. Any of the processors attached to data interconnect fabric 804 may access the light-weight memory expansion modules using the light-weight set of memory access requests through light-weight memory protocol controller 570. Such access may be made by external processors such as GPUs through GMI links GMI0-GMI7 and their respective CCIX enabled Cache-Coherent Masters (CCMs) CCM0-CCM3. Each port controller 512 may also link to a fully CCIX compliant memory expansion module, using different virtual CCIX ports overlaid on communications through the PCIe bus 529.

While this embodiment employs a communication link conforming to the CCIX standard, this characteristic is not limiting, and other high speed communication link standards may instead be used. For example, a Gen-Z standard such as that described in the Gen-Z Core Specification 1.0, published by the Gen-Z Consortium, may be used. In such case, a virtual Gen-Z port and Gen-Z transaction layer may replace CCIX port 522 and CCIX transaction layer controller 523.

In some embodiments, port controller 512, memory access sub-system 800, and the various CCIX agent controllers or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

The techniques herein may be used, in various embodiments, with any suitable systems that employ large memory expansion modules, for example, media servers and data processing platforms. Further, the techniques are broadly applicable for use with processors implemented with CPU and acceleration processors, including memory-centric architectures, in which memory expansion is connected to processors over a high-speed bus or communication link. While particular embodiments have been described, various modifications to these embodiments will be apparent to those skilled in the art. For example, in different protocols such as the Gen-Z standard, the full set of memory requests and the light-weight set without cacheable transactions may differ from the sets described herein.

Accordingly, it is intended by the appended claims to cover all modifications of the disclosed embodiments that fall within the scope of the disclosed embodiments.

What is claimed is:

1. A port controller on an integrated circuit comprising: a physical layer circuit adapted to be coupled to an external Peripheral Component Interconnect Express (PCIe) communication link; a Cache Coherent Interconnect for Accelerators (CCIX) port selectively coupled to the physical layer circuit; a transaction layer controller selectively coupled to the physical layer circuit and adapted to operate according to an alternate protocol; a light-weight memory protocol controller adapted to send requests to and receive responses from a memory through the CCIX port and over the PCIe communication link using a subset of CCIX protocol memory transaction types including only non-cacheable transactions and non-snooping transactions; a remote coherent slave controller adapted to send cache coherency requests over the PCIe communication link using a full set of CCIX protocol memory transaction types; and a multiplexer/demultiplexer operable to selectively couple one of the light-weight memory protocol controller and the remote coherent slave controller to the CCIX port; wherein the light-weight memory protocol controller maintains a memory directory for the memory module which fulfills director-based coherence requests locally, and transforms access requests that include coherency-related requests to a form using only the subset of CCIX transaction types.

2. The port controller of claim 1, wherein the light-weight memory protocol controller operates as a CCIX slave controller to manage access to an external memory module that does not perform CCIX coherent agent functionality, and includes a probe filter which filters out cache coherence probes directed to the memory address space of the external memory module.

3. The port controller of claim 1, wherein the light-weight memory protocol controller maintains a request queue for holding outgoing requests to the memory.

4. The port controller of claim 1, wherein the transaction layer controller is a PCIe transaction layer controller.

5. The port controller of claim 4, further comprising an input/output master/slave controller coupled to the PCIe transaction layer controller and operable to transmit and receive PCIe traffic.

6. The port controller of claim 1, further comprising:
an accelerator coherent master controller coupled to the port controller and adapted to receive and fulfill cache coherency requests over the PCIe communication link using the full set of CCIX protocol memory transaction types; and
a second multiplexer/demultiplexer selectively coupling the accelerator coherent master controller to the CCIX port.

7. The port controller of claim 1, wherein the subset of CCIX protocol memory transactions types includes a read no snoop request type, a write no snoop full request type, and a write no snoop partial request type.

8. A method comprising: selectively coupling a light-weight memory protocol controller to a Cache Coherent Interconnect for Accelerators (CCIX) port; subsequently, over an on-chip interconnect fabric, receiving memory access requests from a processor and, in response, transmitting associated memory access requests to an external memory through the CCIX port using only a proper subset of CIX protocol memory transaction types including non-cacheable transactions and non-snooping transactions; selectively decoupling the light-weight memory protocol controller from the CCIX port and coupling a remote coherent slave controller to the CCIX port; and subsequently; at the remote coherent slave controller, receiving memory access requests over the on-chip interconnect fabric and, in response, transmitting associated memory access requests to a memory module through the CCIX port using cacheable CCIX protocol memory transaction types; maintaining, at the light-weight memory protocol controller, a memory directory for memory which fulfills directory-based coherence requests locally, and transforms access requests that include coherency-related requests to a form using only the subset of CIX transaction types.

9. The method of claim 8, further comprising, at the light-weight memory protocol controller, maintaining a request queue for holding outgoing requests to the memory module.

10. The method of claim 8, further comprising:
selectively coupling an accelerator coherent master controller to the CCIX port; and
subsequently, at the accelerator coherent master controller, receiving and fulfilling cache coherency requests from an external processing accelerator through the CCIX port using cacheable CCIX protocol memory transaction types.

11. The method of claim 8, further comprising:
selectively decoupling the CCIX port from a physical layer circuit;
selectively coupling an input/output master/slave controller to the physical layer circuit through a transaction layer controller configured to operate with an alternate protocol; and
transmitting and receiving traffic according to the alternate protocol at the input/output master slave controller.

12. The method of claim 11, wherein the alternate protocol is a Peripheral Component Interconnect Express (PCIe) protocol.

13. The method of claim 8, wherein the proper subset of CCIX protocol memory transactions types includes a read no snoop request type, a write no snoop full request type, and a write no snoop partial request type.

14. A data processing system comprising: at least one processor and an interconnect fabric coupled to the at least one processor; a port controller coupled to the interconnect fabric, comprising: a physical layer circuit adapted to be coupled to a Peripheral Component interconnect Express (PCIe) communication link; a Cache Coherent interconnect for Accelerators (CCIX) port selectively coupled to the physical layer circuit; a transaction layer controller selectively coupled to the physical layer circuit and adapted to operate according to an alternate protocol; a light-weight memory protocol controller coupled to the interconnect fabric and adapted to send requests to and receive responses from a memory through the CCIX port and over the PCIe communication link using a subset of CCIX protocol memory transaction types including only non-cacheable transactions and non-snooping transactions; a remote coherent slave controller coupled to the interconnect fabric and adapted to send cache coherency requests over the PCIe communication link using a full set of CCIX protocol memory transaction types; and a multiplexer/demultiplexer operable to selectively couple one of the light-weight memory protocol controller and the remote coherent slave controller to the CCIX port; wherein the light-weight memory protocol controller maintains a memory directory for the memory which fulfills directory-based coherence requests locally, and transforms access requests that include coherency-related requests to a form using only the subset of CCIX transaction types.

15. The data processing system of claim 14, wherein the light-weight memory protocol controller operates as a CCIX slave controller to manage access to an external memory module that does not perform CCIX coherent agent functionality, and includes a probe filter which filters out cache coherence probes directed to the memory address space of the external memory module.

16. The data processing system of claim 12, wherein the light-weight memory protocol controller maintains a request queue for holding outgoing requests to the memory.

17. The data processing system of claim 12, further comprising:
an accelerator coherent master controller coupled to the interconnect fabric and the port controller and adapted to receive and fulfill cache coherency requests from an external processing accelerator over the PCIe communication link using the full set of CCIX protocol memory transaction types; and
a second multiplexer/demultiplexer selectively coupling the accelerator coherent master controller to the CCIX port.

18. The data processing system of claim 12, further comprising an input/master/slave controller coupled to the transaction layer controller and operable to transmit and receive traffic according to the alternate protocol.

19. The data processing system of claim 18, wherein the alternate protocol is a Peripheral Component Interconnect Express (PCIe) protocol.

20. The data processing system of claim 12, wherein there are at least two processors, and further comprising a second port controller having a physical layer circuit, a CCIX port, a transaction layer controller, a light-weight memory protocol controller, a remote coherent slave controller, and a multiplexer/demultiplexer configured like those of the port controller, wherein the interconnect fabric selectively couples any of the processors to the port controller or the second port controller.

* * * * *